United States Patent [19]
Riemersma et al.

[11] 3,935,547
[45] Jan. 27, 1976

[54] HIGH PRESSURE GAS LASER USING UNIFORM FIELD ELECTRODE CONFIGURATION WITH IRRADIATION BY CORONA DISCHARGE

[75] Inventors: Henry Riemersma, Pittsburgh, Pa.; Owen Farish, Bearsden, Glasgow, Scotland

[73] Assignee: Westinghouse Electric Corporation, Pittsburgh, Pa.

[22] Filed: May 30, 1973

[21] Appl. No.: 365,391

[52] U.S. Cl............ 331/94.5 PE; 330/4.3; 313/198; 313/231.4
[51] Int. Cl.².................... H01S 3/097; H01S 3/22
[58] Field of Search.................... 331/94.5; 330/4.3; 313/231.1, 231.4, DIG. 5, 197, 198

[56] References Cited
OTHER PUBLICATIONS
Denes et al., Electronic Letters, Vol. 7, No. 2, June, 1971, pp. 337–338.
Targ et al., IEEE J. of Quantum Electronics, QE8, No. 2, Feb. 1972.

Primary Examiner—Robert J. Webster
Attorney, Agent, or Firm—R. M. Trepp

[57] ABSTRACT

A molecular gas laser capable of operating at or near atmospheric pressure in which electrical energy is coupled into an active molecular gas medium comprising molecules having vibrational rotational energy levels by means of an electric field transverse to the lasing axis. By applying an impulse voltage to the electrode configuration, high current glow discharges can be created. The pulse discharge takes place between electrodes having parallel planar surfaces facing each other. The lateral edges of these faces are suitably profiled to avoid field concentrations and thus provide a diffused glow discharge in a uniform electric field transverse to the lasing axis. Initiatory electrons required to produce the high current diffused glow are provided by generating an intense burst of corona in the gap between spacer members having very high dielectric constants which are interposed between the electrodes. Specifically, when a voltage pulse is applied to the gap between the spacer elements a very high field appears at the interface and generates an intense burst of corona which provides ultraviolet irradiation of the cathode resulting in the emission of electrons.

16 Claims, 10 Drawing Figures

PRIOR ART

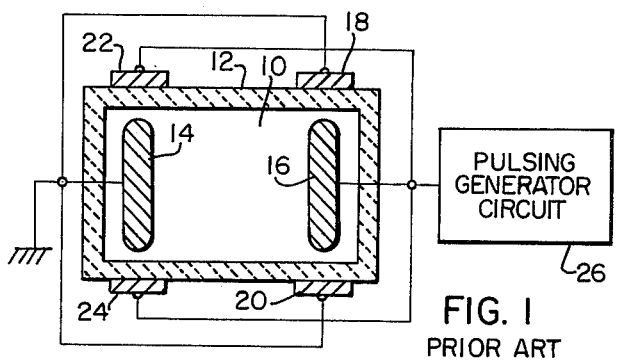
FIG. 1
PRIOR ART
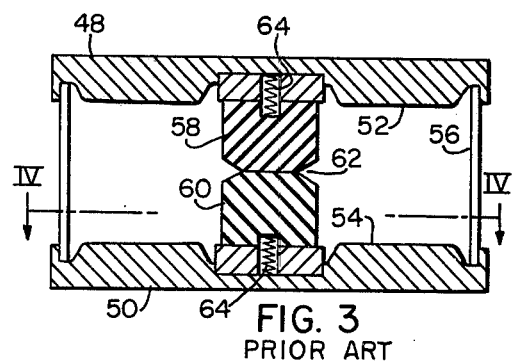
FIG. 3
PRIOR ART
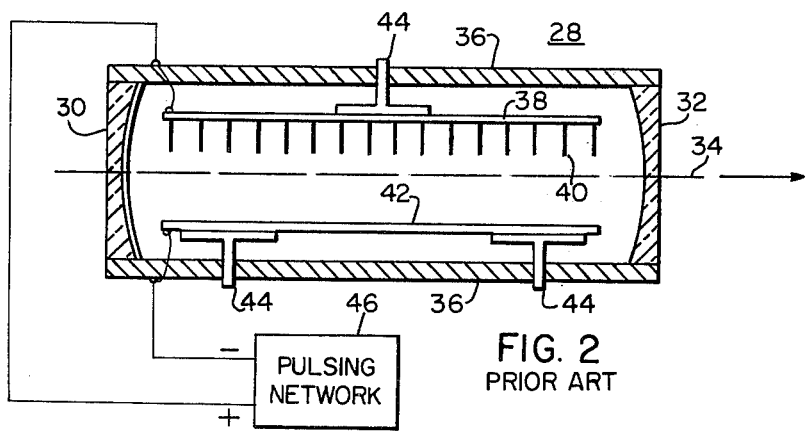
FIG. 2
PRIOR ART
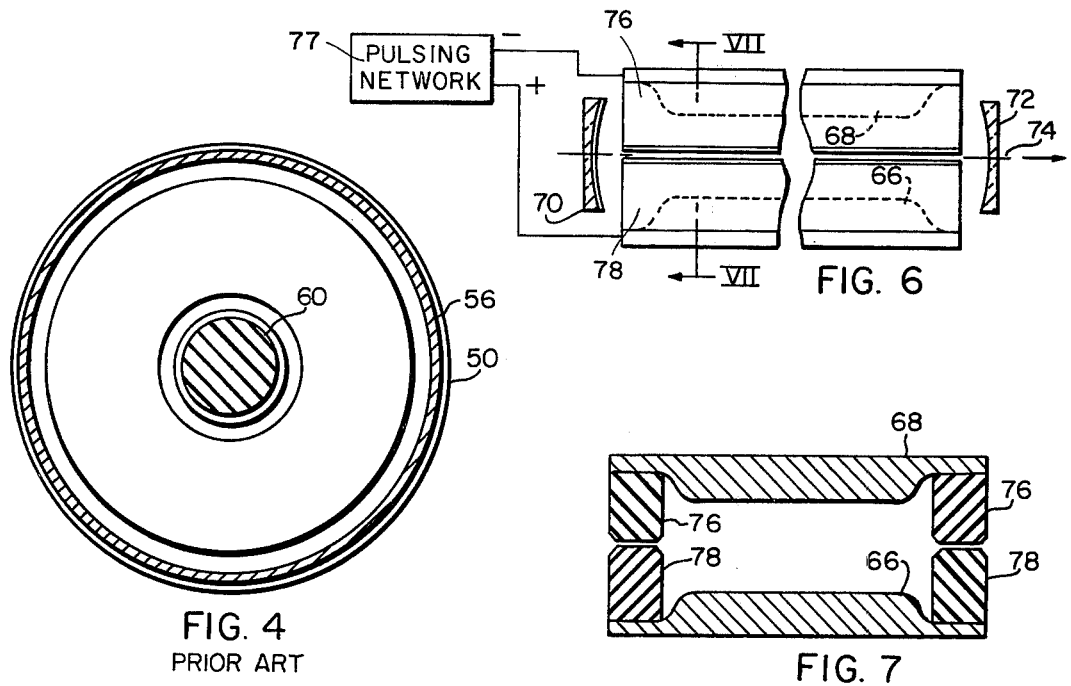
FIG. 4
PRIOR ART
FIG. 6
FIG. 7

HIGH PRESSURE GAS LASER USING UNIFORM FIELD ELECTRODE CONFIGURATION WITH IRRADIATION BY CORONA DISCHARGE

BACKGROUND OF THE INVENTION

1. Field of the Invention

This invention relates generally to high pressure gas lasers which are repetitively pulsed and more particularly to the use of a uniform field electrode configuration utilizing cathode irradiation by corona discharge to provide initiatory electrons.

2. Description of the Prior Art

In a copending patent application Ser. No. 740,221, filed June 26, 1968, in the name of Coleman J. Miller and owned by the assignee of this application, there is described and claimed a high power stimulated emission of radiation device using transverse electric field excitation of a gaseous medium having molecules with vibrational and rotational energy levels, between two parallel electrodes capable of operating at atmospheric pressures and above. Prior to the invention in that application, there was the problem that the electrical discharge in the gaseous medium tended to occur in the form of an arc as the pressure in the laser device increased above some low value, typically 20 to 50 torr. Such an arc would be supported by a very limited portion of the gaseous medium in a small column around the arc and the gain consequently would not be sufficient to cause laser action. The result was localized heating of the gas generally preventing laser operation entirely.

In the Miller application, means for irradiating the cathode with ultraviolet light for producing free electrons by photoelectric emission from the cathode is disclosed. The free electrons in turn produce a glow discharge uniformly over the surface of the electrodes which is self-sustaining when the conditions of voltage and electrode gap dimensions are such that each electron leaving the cathode establishes secondary processes whereby it is replaced by a new electron leaving the cathode. The free electrons produced in the glow discharge near the cathode engage in exciting collisions with ions, atoms or molecules of the gaseous medium in regions more remote from the cathode. In these excitation regions there is a lower ratio of electric field to particle density (E/N) and an amplifying action results by the further interchange of energy between free electrons and unexcited particles and between excited and unexcited particles of the gas.

The geometry of the electrode configuration and the ratio of (E/N) are important in the above type laser apparatus to establish the proper conditions for transfer of energy from the electrical energy source to the gaseous medium. The choice of electrode geometry and (E/N) ratio can improve the efficiency of energy transfer from the electrical energy source into selected modes of excitation of the gaseous medium which in turn can increase the overall efficiency of the laser device for a selected output frequency.

In the above-mentioned Miller application, means in the form of an ultraviolet light source for irradiating the cathode is disclosed for producing free electrons by photoelectric emission from the cathode causing a uniform glow discharge over the surfaces of the electrodes. As previously noted the glow discharge is self-sustaining when the conditions of voltage and dimensions of the gap between the electrodes are such that each electron leaving the cathode establishes secondary processes whereby it is replaced by a new electron leaving the cathode. The free electrons in such a glow discharge are accelerated by the electric field and excite the ions, atoms or molecules of the gaseous medium in inelastic collisions in regions remote from the cathode thereby causing an amplifying action by way of the further exchange of energy between free electrons and unexcited particles and between excited and unexcited particles of the gas. Since there is an infinite number of points on the planar plate electrode, a substantially uniform diffused glow discharge can be maintained for a limited time between the plates so that energy may be transferred from the electric field to the molecules of the active gaseous medium. This makes it possible to operate a gas laser in a pulsed mode at pressures higher than what was generally considered the cut-off threshold pressure for such devices (in the neighborhood of 20 Torr).

Another prior art technique for providing free electrons to initiate the diffused glow discharge in a high pressure gas laser having parallel plate electrodes is to use auxiliary electrodes adjacent each main parallel plate electrode for discharge initiation. The auxiliary electrodes closest to the cathode initiate a trigger discharge between cathode and auxiliary electrodes to provide the initiatory electrons for the main gap which is pulsed from the same source. The auxiliary electrodes nearest the anode are said to "focus" the beam in the vicinity of the anode.

In another prior art device in which a plurality of pins comprising one electrode means is positioned opposite a bar electrode, triggering of the glow discharge is accomplished by field emission at the pins when an impulse voltage is applied. Initiatory electrons are thereby provided because of the inherent physical properties of the nonuniform field configuration.

In an analogous art area U.S. Pat. No. 2,990,492 issued to Wellinger et al teaches the application of a solid state radioactive medium to lightning arresters whereby the radioactive medium supplies free electrons to initiate a power absorbing arc stream or discharge for the purpose of protecting power lines. This patent is representative of the art dealing with those protective devices whose primary purpose is to develop an arc stream or discharge. Such devices are the antithesis of the present invention because it is the prevention of an arc stream or discharge which must be accomplished while producing a very fast rise time in a diffused glow discharge. An arc stream or discharge in a gas laser causes the device to cease operating immediately and can cause serious damage to the electrodes.

The present invention relates to the broad field of producing an improved transfer of energy from the electric field to the selected rotational vibrational modes of molecules of a gas medium in a laser system. Free electrons are generated and accelerated by the electric field applied to the gaseous medium. Since the energy that each electron receives from the electric field depends upon the strength of the field and the distance through which the electron is accelerated by the field between collisions, energy losses can be minimized in relation to the toal input energy to the electric field by adjusting certain parameters. Also, the transfer of energy from the electrons to the selected vibrational rotational modes of the gas molecules can be maximized.

Generally speaking, there are two basic systems that have been used in the prior art to which the present invention relates as far as electron excitation of the molecules is concerned. The gaseous medium can be excited by RF energy with electrodes placed external to the gaseous medium container or it can be excited by applying a voltage either DC or AC, across a pair of electrodes immersed in the gaseous medium. As a practical matter, the excitation process has a significant influence on the operation of a gas laser device. The optimum operating pressure is limited by thermal consideration. As the pressure increases above approximately 20 Torr in a static volume of gas there is a tendency for a discharge to occur in the form of an arc streamer. This creates heat with a very high thermal gradient which adversely affects the lasing operation. The objective in this art is then to create a self-sustaining diffused glow discharge and maintain it in this mode as long as possible before thermal effects cause an arc streamer. An arc streamer discharge will cause constriction of the discharge, rapid temperature rise, and immediate cessation of the lasing operation.

SUMMARY OF THE INVENTION

Briefly, the present invention is an improvement in the high pressure gas laser art for generating a diffused glow discharge for the purpose of generating electrons which in turn excite the gaseous laser medium by collision with the gas molecules. The present invention provides a laser in which the gas medium is excited by the diffused glow discharge between two electrodes having continuous surfaces, the surfaces being so configured that there are no angular edge configurations to distort an essentially uniform electric field between the electrodes. Regions of uniform electric field density are thereby developed when a pulsed voltage is repetitively applied to the electrodes. The specific improvement to which the present invention is directed is the means for providing free electrons to initiate the diffused glow discharge mode of operation of the laser. The present invention provides for a plurality of member pairs made of a material having a high dielectric constant such as titanium dioxide (rutile) which are positioned between or adjacent the main gap region and in intimate contact with the two main electrodes. A voltage pulse applied to the main electrodes causes a very high field to appear at the edges of the members because of the high dielectric constant of the material. This generates an intense burst of corona which provides free electrons directly and irradiates the cathode with ultraviolet radiation thereby generating additional electrons. These initiatory electrons trigger a pulsed glow discharge for exciting the gas to lasing energy levels.

BRIEF DESCRIPTION OF THE DRAWINGS

FIGS. 1 and 2 are schematic diagrams of prior art electrode configurations for supplying free electrons to the diffused glow discharge;

FIG. 3 is a schematic diagram of a prior art lightning arrester type gap;

FIG. 4 is a cross-section of the device of FIG. 3 taken on the line IV—IV;

FIG. 6 is an elevational view of a laser according to the present invention;

FIG. 7 is a section of the laser illustrated in FIG. 6, the section being taken on the lines VII—VII;

DETAILED DESCRIPTION OF THE DRAWINGS

Figure 5:
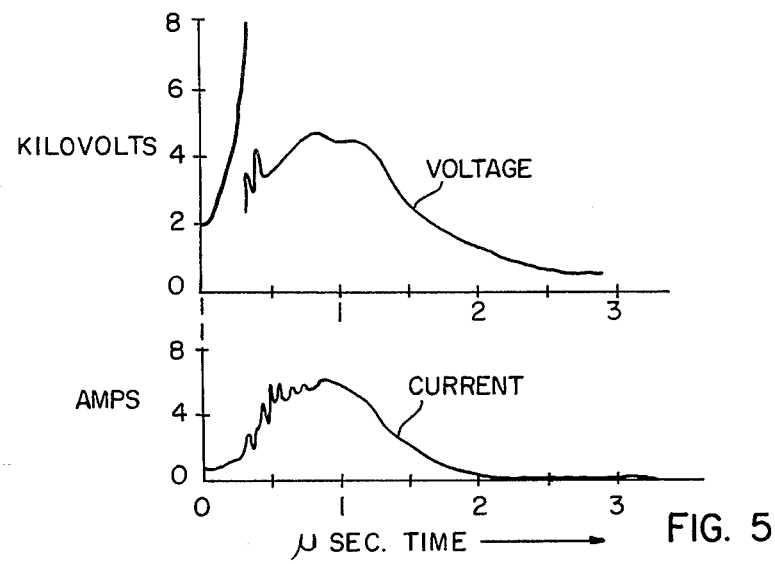
FIG. 5 is the current and voltage waveform for the annular uniform field gap of the device shown in FIG. 3 with a gas laser mixture at high pressure.

Referring now to the drawings, specifically FIG. 1, a prior art uniform field laser cavity 10 defined by walls 12 is shown. Main planar electrodes 14 and 16 are situated inside cavity 10. Electrode 16 acts as a cathode and electrode 14 acts as an anode. Auxiliary electrodes 18 and 20 are affixed to the exterior wall 12 adjacent opposite edges of electrode 16. Auxiliary electrodes 22 and 24 are affixed to the exterior walls 12 adjacent opposite edges of electrode 14.

Auxiliary electrodes 18 and 20 and main electrode 14 are connected to ground potential. Auxiliary electrodes 22 and 24 and main electrode 16 are connected to pulsing circuit 26.

The principle of operation of the device shown in FIG. 1 is not completely understood, but it appears to depend upon the initiation of a trigger discharge between the cathode electrode 16 and the auxiliary electrodes 18 and 20. This initial discharge provides large numbers of electrons which then initiate a diffused glow discharge in the main gap between electrodes 14 and 16. The function of the auxiliary electrodes 22 and 24 is evidently to confine the discharge to the main gap and to focus it toward the anode 14.

FIG. 2 shows a second prior art gas laser apparatus in cross section. A gas tube 28 is shown having an essentially totally reflecting optical element 30 and a partially transmitting optical element 32 positioned opposite one another and orthogonal to the optical axis 34 of the laser. Side wall 36 is sealed in an air tight manner to the optical elements 30 and 32 to provide an integral enclosure for the gas medium of the laser. It will be understood that the elements of the tube 28 can be modified without affecting the claimed invention, tube 28 being merely typical in the art.

Once the gas tube 28 has been evacuated it is filled with a suitable laser gas mixture, which for example might include CO or $CO_2$, at a high pressure, typically above 50 torr.

Within the tube 28 a cathode 38 comprised of a plurality of pins 40 and an anode 42 typically a continuous bar type electrode, are positioned opposite one another within the tube 28. The pins 40 of cathode 38 are transverse to the optical axis 34 while the surface of anode 42 lies parallel to the optical axis 34. The support within the tube 28 for the electrodes 38 and 42 is provided by support means 44.

The electrodes 38 and 42 are connected to a pulsing network 46.

Under certain conditions of stored energy in the pulsing network it is possible upon acquiring an impulse voltage to the configuration shown in FIG. 2 to create a diffuse, transient, high current glow discharge between the pins 40 and electrode 42. Electrons for initiation of the pulse glow are provided by field emission at the pins and the current is amplified by collisional ionization in the high field region of the gap near the pins thereby providing large numbers of electrons in the gap between the pins 40 and anode 42. In the lower field region of the gap near the anode 42 the electrons undergo exciting collisions to achieve the required vibrational levels of the gas medium. In order to obtain the required diffuse discharge mode and avoid a constricted high temperature spark discharge which would terminate the lasing action, it is necessary in this prior art device to have a very rapid current rise time typically less than 100 nanoseconds. The glow duration in this particular configuration would be typically of the order of 0.5 microseconds.

While the device of FIG. 2 represents a high pressure laser system in which high repetition rates and high average powers can be obtained, it is desirable to increase the glow duration while reducing the peak pulse power. Switching problems are reduced and the output characteristics of the laser improved. To achieve such improved performance electrodes utilizing uniform field geometry can be implemented in place of the multiple pin geometry provided that large numbers of initiatory electrons can be generated to produce the high current diffuse glow required.

In FIGS. 3 and 4 a lightning arrester type gap found in the prior art is shown in which a concept for generating initiatory electrons is used. The device is comprised of two electrodes 48 and 50 having spaced apart surfaces 52 and 54. An exterior dielectric wall 56 separates the electrodes 48 and 50 and effectively seals the gas discharge volume between the electrodes 48 and 50. At the center of each electrode a button of high dielectric constant material such as titanium dioxide (also identified as rutile) projects into the discharge volume. The buttons 58 and 60 abut at interface 62, each being held firmly in place by a spring mechanism 64.

The main gap between surfaces 52 and 54 as shown in FIG. 3 is of interest in that it utilizes a configuration similar to that of the invention taught and claimed herein but which is applied quite differently. In a lightning arrester application it is essential that abnormally high potentials, caused usually by lightning transients, may be relieved by flashovers in the air or a gas rather than over the surface of porcelain insulating elements. For this reason, it is necessary to have a well defined sparkover voltge path. Using the gap of FIGS. 3 and 4, a well defined sparkover voltage under ramp voltage conditions is possible, thereby providing rapid release from the high potential appearing across the electrodes in the form of an arc discharge.

Using an annular uniform field gap configuration similar to that of the device of FIGS. 3 and 4 with a gas laser mixture at high pressure, current and voltage responses as shown in FIG. 5 have been obtained while generating a glow discharge with no spark or arc discharge. The current and voltage measurements across the gap region were made at a gas pressure of 400 torr and for an applied pulse of 30 kv for a gas mixture of 6 parts He: 1 part $N_2$: 1 part $CO_2$.

The current and voltage waveforms shown in FIG. 5 reflect that for a period of current flow (approaching $2\mu sec$) there was no arc discharge. An arc discharge would have been characterized by a sudden drop of voltage. It has generally been found that this configuration specifically utilizing the rutile buttons 58 and 60 for initiatory corona discharge allows for a longer glow duration as compared to prior art devices such as the pin-plane electrode assembly of FIG. 2.

In FIGS. 6 and 7 an elevational view and a sectional view respectively are shown of a single pass laser utilizing the present invention. In FIG. 6, contoured planar electrodes 66 and 68 are connected to pulsing network 77 and are spaced apart with surfaces parallel to the optical axis 74 defining a uniform field region. Reflecting optical elements 70 and 72 are disposed at either end of the electrodes 66 and 68 to form a resonant cavity for the stimulated radiation. Reflector 72 is partially transmissive in order to couple out a portion of the stimulated radiation. The laser beam axis 74 is parallel to and lies between the surfaces of the electrodes 66 and 68.

The sectional view of FIG. 7 shows a set of two elongated members 76 attached at either side of the electrode 68 and projecting into the discharge gap in the general direction of the uniform field. A second set of two elongated members 78 are similarly attached to electrode 66, each projecting toward a corresponding member 76 in a contiguous relationship. Corresponding members 76 and 78 can be in direct contact or the surfaces thereof may define a narrow gap region. It will be recognized that each set can be comprised of one or more members.

The members 76 and 78 are constructed of a high dielectric constant material such as titanium dioxide (rutile). When a voltage pulse from pulsing network 77 is applied to the gap between the electrodes 68 and 66, a very high field appears at the button interface generating an intense burst of corona. The burst of corona provides both free electrons directly to the main discharge gap and irradiates the cathode with ultraviolet radiation thereby generating additional electrons by photoemission at the cathode and by gas photoionization.

The dielectric members 76 and 78 function as dielectric discharge initiators for purposes of pulsed laser operations. They can be in the shape of elongated bars as shown in FIG. 6 having abutting surfaces essentially of a rectangular shape. Or, the members can be button shaped with abutting circular surfaces. Indeed the buttons can even be hollow and closed at the ends having metallic pieces extending into them. It will readily be recognized that the particular configuration of buttons used and dimensions chosen will be dependent upon the efficiency of irradiating the cathode with ultraviolet radiation while maintaining an essentially uniform field between the electrodes. It will also be appreciated that when using the cylindrically shaped dielectric discharge initiators or buttons that they can be arranged in a single or a plurality of rows, the particular arrangement being one factor in determining the uniformity and optical homogeneity of the pulse glow discharge.

Figures 8, 9:
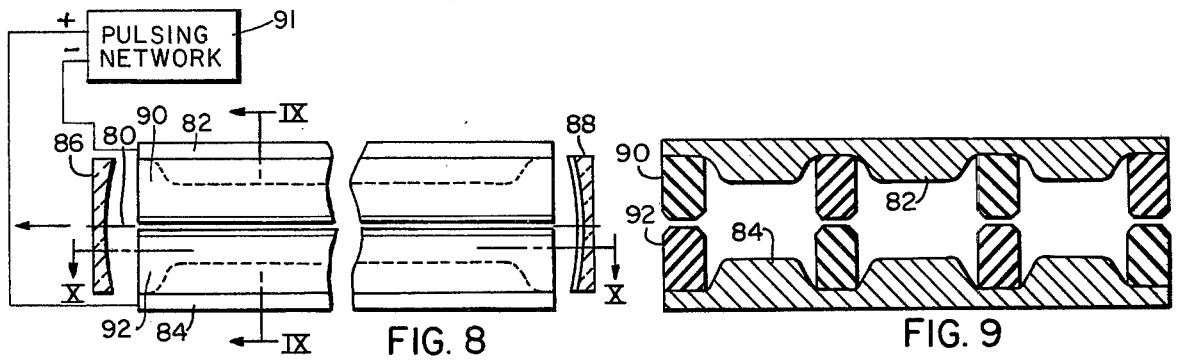
FIG. 8 is an elevational view of a multipath laser according to the present invention.
FIG. 9 is a section of the laser of FIG. 8, the section being taken on the line IX—IX.
Figure 10:
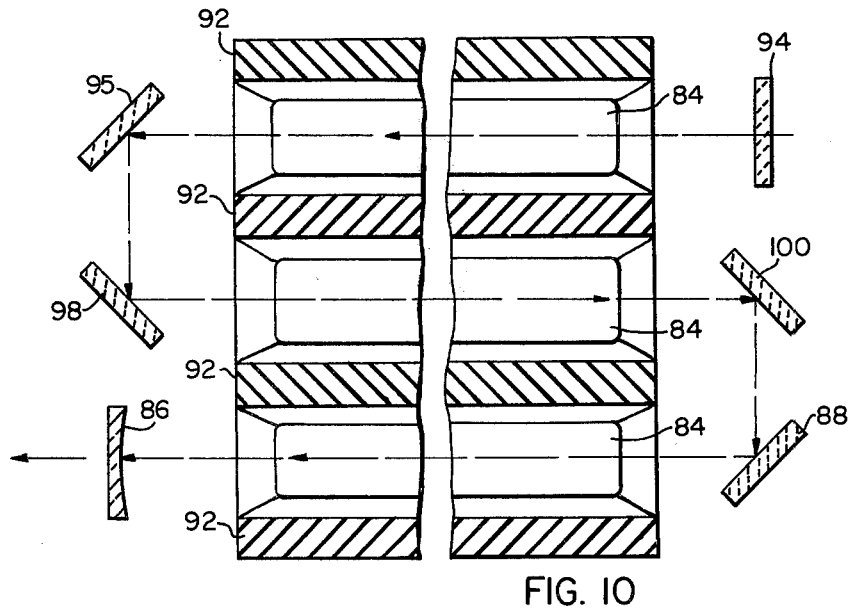
FIG. 10 is a plan view of the multipath laser of FIG. 8 including the folded optics.

In FIGS. 8, 9 and 10 several views of a multipath laser using folded optics is shown. FIG. 8 shows one path of the beam along the laser axis 80 which runs parallel and between the surfaces of planar electrodes 82 and 84. Dielectric members 90 and 92 abut at their interface. Optical reflecting elements 86 and 88 are disposed at either end of the planar electrodes to define a resonant cavity for the stimulated radiation. Optical element 86 is partially transmissive coupling the radiation out of the cavity.

FIG. 9 shows in cross-section the multipath laser which is identical to that cavity shown in FIG. 7 except for having three instead of a single excitation gap region. The members or dielectric discharge initiators 90 are attached to the electrode 82 and project into the gap region. The members or dielectric discharge initiators 92 are attached to the electrode 84 and project into the gap region abutting against corresponding dielectric discharge initiators 90 in the vicinity of the mid-gap region. The end edge surfaces of members 90 and 92 are beveled to expose greater discharge volume to the corona discharge.

In FIG. 10, a sectional plan view is shown of the multipath laser. Optical reflective elements 86, 88, 94, 95, 98 and 100, are so arranged as to fold the laser beam along the multiple paths defined by the electrodes 82 and 84 and the dielectric discharge initiators 90 and 92. The optical element 86 being partially transmissive couples some of the radiation out of the cavity.

The use of the dielectric members or dielectric discharge initiators for supplying the initiatory electrons permits the use of planar electrodes to develop a uniform field in place of the prior art pin cathode configuration. The advantages achieved include a longer glow duration than normally can be attained in the pin-cathode system. This is achieved with lower peak current in the pulse generator switching element and lower output peak powers for a given average power.

The current rise time limitations are less critical for this electrode geometry. This essentially means that the pulsing network 91 switching element does not need to meet as high a requirement for the rate of change of current.

In the laser application it is most desirable that the glow be uniformly distributed over the surface of the planar electrode. By proper arrangement of the dielectric discharge initiators a uniform injection of initiatory electrons into the discharge region is achieved either directly or by ultraviolet radiation from the corona discharge which generates additional electrons by photoemission at the cathode and by gas photoionization, and a homogeneous glow discharge results.

The uniform field configuration of this invention is simpler than that developed in the prior art and shown in FIG. 1 in that no auxiliary electrodes are required. Additionally, there is no danger of damage to the cavity walls by a trigger discharge.

We claim:

1. A high pressure gas laser apparatus comprising:
   a resonant optical cavity including optical reflective elements passively terminating each end of said cavity,
   a gas medium at high pressure suitable for lasing action,
   an electrode assembly having first and second spaced apart electrodes with continuous surfaces defining a uniform field gap therebetween, said uniform field gap traversing said resonant optical cavity,
   a first set of members of a high dielectric constant material fixedly and conductively attached to the first electrode and extending into said gap,
   a second set of members of a high dielectric constant material fixedly and conductively attached to the second electrode and extending into said gap so that end surfaces of corresponding members of said first and second sets are in contiguous relationship,
   pulsing means connected to said first and second electrodes for applying pulsed energy to said gap for stressing said uniform field gap and for generating corona discharges between said first and second sets of members for supplying free electrons to said uniform field gap and for irradiating said first electrode with ultraviolet radiation to cause emission of additional electrons for initiating and maintaining glow discharge between said first and second electrodes for exciting said gas medium to upper energy levels to induce lasing action.

2. The high pressure gas laser apparatus of claim 1 wherein said first and second sets of members are made of titanium dioxide.

3. The high pressure gas laser apparatus of claim 1 wherein said members are configured as elongated bars set parallel to said resonant optical cavity and have abutting surfaces of a rectangular configuration.

4. The high pressure gas laser apparatus of claim 1 wherein the abutting surfaces of said members of said first and second sets are circular.

5. The high pressure gas laser apparatus of claim 1 wherein said first and second sets of members are so arranged and configured to provide a plurality of parallel laser beam paths and further including optical means adjacent said electrodes for folding said laser beam from path to path.

6. The high pressure gas laser apparatus of claim 1 wherein said corresponding members of said first and second sets have end surfaces touching.

7. The high pressure gas laser apparatus of claim 1 wherein the end surfaces of said corresponding members of said first and second set define a gap region therebetween.

8. The high pressure gas apparatus of claim 7 wherein the distance separating the end surfaces of said corresponding members of said first and second set is small compared to the dimensions of the end surfaces of said corresponding members.

9. A high pressure gas laser, capable of producing stimulated emission of radiation, comprising:
   an enclosure,
   a gas medium at high pressure suitable for lasing action,
   an electrode assembly having first and second spaced apart electrodes with continuous surfaces defining a uniform field gap therebetween,
   a first set of members of a high dielectric constant material fixedly and conductively attached to the first electrode and extending into said gap,
   a second set of members of a high dielectric constant material fixedly and conductively attached to the second electrode and extending into said gap so that end surfaces of corresponding members of said first and second sets are in contiguous relationship,
   pulsing means connected to said first and second electrodes for applying pulsed energy to said gap for stressing said uniform field gap and for generating corona discharges between said first and second sets of members for supplying free electrons to said uniform field gap and for irradiating said first electrode with ultraviolet radiation to cause emission of additional electrons for initiating and maintaining glow discharge between said first and second electrodes for exciting said gas medium to upper energy levels to induce lasing action,
   means for stimulating the emission of radiation from said excited gas medium.

10. The high pressure gas laser apparatus of claim 9 wherein said first and second sets of members are made of titanium dioxide.

11. The high pressure gas laser apparatus of claim 9 wherein said members are configured as elongated bars and have abutting surfaces of a rectangular configuration.

12. The high pressure gas laser apparatus of claim 9 wherein the abutting surfaces of said members of said first and second sets are circular.

13. The high pressure gas laser apparatus of claim 9 wherein said first and second sets of members are so arranged and configured to provide a plurality of parallel laser beam paths and further including optical means adjacent said electrodes for folding said laser beam from path to path.

14. The high pressure gas laser apparatus of claim 9 wherein said corresponding members of said first and second sets have end surfaces touching.

15. The high pressure gas laser apparatus of claim 9 wherein the end surfaces of said corresponding members of said first and second set define a gap region therebetween.

16. The high pressure gas laser apparatus of claim 15 wherein the distance separating the end surfaces of said corresponding members of said first and second set is small compared to the dimensions of the end surfaces of said corresponding members.

* * * * *